United States Patent [19]

Matsumoto

[11] Patent Number: 5,253,680
[45] Date of Patent: Oct. 19, 1993

[54] DUPLEX METAL PIPE FOR DAMPING

[75] Inventor: Takeshi Matsumoto, Numazu, Japan

[73] Assignee: Usui Kikusai Sangyo Kaisha Ltd., Japan

[21] Appl. No.: 687,210

[22] Filed: Apr. 18, 1991

Related U.S. Application Data

[63] Continuation of Ser. No. 453,590, Dec. 20, 1989, abandoned.

[30] Foreign Application Priority Data

Dec. 29, 1988 [JP] Japan ................ 63-335627

[51] Int. Cl.⁵ ............................................. F16L 9/14
[52] U.S. Cl. ................................................ 138/148
[58] Field of Search ................ 138/148; 464/180, 183

[56] References Cited

U.S. PATENT DOCUMENTS

| | | | |
|---|---|---|---|
| 3,196,905 | 7/1965 | Hills | 138/148 |
| 3,209,856 | 10/1965 | Saunders | 138/148 X |
| 4,185,463 | 1/1980 | Tanahashi et al. | 138/148 X |
| 4,410,013 | 10/1983 | Sasaki et al. | 138/148 X |

Primary Examiner—Stanley N. Gilreath
Assistant Examiner—John P. Darling
Attorney, Agent, or Firm—Anthony J. Casella; Gerald E. Hespos

[57] ABSTRACT

A duplex metal pipe for damping wherein an inner pipe is inserted into an outer pipe with a clearance of 10 μm to 150 μm provided between an inner surface of the outer pipe and an outer surface of the inner pipe. The outer pipe and said inner pipe are formed of a steel pipe.

6 Claims, 1 Drawing Sheet

DUPLEX METAL PIPE FOR DAMPING

This application is a continuation of application Ser. No. 453,590 which was filed on Dec. 20, 1989 and is now abandoned.

BACKGROUND OF THE INVENTION

1. Field of the Invention

The present invention relates to a duplex metal pipe for damping which is used, for instance, at a portion of an exhaust system of an automobile where vibrations occur and displays a performance of damping the vibrations.

2. Description of the Related Art

In a place of the occurrence of vibrations, such as an exhaust pipe of an automobile, vibrations of an engine, or those resulting from the pulsation of exhaust gas pressure are transmitted to a pipe, and are emitted as noise in the form of the vibration of the pipe itself. To reduce the amounts of vibration and resultant noise, there are known a hollow duplex pipe in which a sufficient space is formed between an inner pipe and an outer pipe and a composite duplex pipe in which a sound-arresting material formed of glass fibers, asbestos, ceramics is filled in the gap between an inner pipe and an outer pipe.

However, with the conventional hollow duplex pipe is not very effective with respect to radiating noise caused by the transmission of engine vibrations although it is effective with respect to radiating noise caused by the pulsation of exhaust gas pressure. In addition, with the composite duplex pipe in which a sound arresting material is filled in an intermediate layer, there has been a problem in that the filler is denatured due to the effect of the heat of exhaust gases and its effect is caused to decline appreciably.

SUMMARY OF THE INVENTION

Accordingly, an object of the present invention is to provide a duplex metal pipe for damping which excels in its damping performance and is not affected by the effect of heat, thereby overcoming the above-described drawbacks.

In order to overcome the above-described problems, the present inventor conducted research to attain the aforementioned object and devised the present invention after discovering the following facts: In the case of flat steel plates of the same material, if two flat steel plates having different thicknesses are brought into contact with each other, and an impact is applied by fixing one end, the phases of the respective vibrations are offset due to a difference in the intrinsic frequency resulting from a difference in the thickness, and the two plates contact each other. Hence, the impact noise is small, and a very large degree of damping is displayed. In the case where two steel plates having the same thickness are brought into contact with each other and one ends thereof are fixed, the plates issue vibratory noise of identical frequencies, and the phases remain identical even after a lapse of time and do not affect each other, so that no degree of damping is displayed. On the other hand, in cases where the thicknesses are different, if the two plates are spaced apart from each other so that they do not contact each other, the two plates vibrate freely with respectively different intrinsic frequencies and do not contact each other, so that the vibration does not decrease.

In contrast, in the case of a duplex pipe, if the inner pipe is brought into contact with the outer pipe, the two pipes assume a state in which they are fitted with each other with no clearance therebetween. In addition, since there is no degree of independent freedom in the respective pipes, the inner and outer pipes become integral, so that the vibration issued from this duplex pipe becomes identical with that of a single pipe in which the thicknesses of the two pipes are combined. For that reason, in order to obtain a damping effect, a very small clearance which allows the inner and outer pipes to contact each other by vibration needs to be provided between the inner and outer pipes. Hence, as a result of conducting much research, the inventor has devised the present invention by discovering that the damping efficiency can be improved by providing a clearance of a specific range. That is, in accordance with the present invention there is provided a duplex metal pipe for damping wherein an inner pipe is inserted into an outer pipe with a clearance of 10 $\mu$m to 150 $\mu$m provided between an inner surface of the outer pipe and an outer surface of the inner pipe.

In the present invention, a clearance of 10 $\mu$m to 150 $\mu$m is provided between the inner surface of the outer pipe and the outer surface of the inner pipe. The reason for restricting the clearance is that if the clearance is less than 10 $\mu$m, since wavy portions are unavoidably present in pipes, portions of contact between the inner and outer pipes become numerous, so that no degree of independent freedom is secured for the respective pipes, thereby making the state of the two pipes similar to that of the aforementioned single pipe. On the other hand, if the clearance exceeds 150 $\mu$m, there occurs a so-called chattering which is produced as the outer wall of the inner pipe and the inner wall of the outer pipe collide against each other during vibration, and the degree of contact between the wall surfaces of the two pipes becomes small, so that a sufficient damping cannot be obtained.

The above and other objects, features and advantages of the invention will become more apparent from the following detailed description of the invention when read in conjunction with the accompanying drawings.

BRIEF DESCRIPTION OF THE DRAWINS

FIG. 1 is a cross-sectional view in a diametrical direction of a duplex metal pipe for damping in accordance with an embodiment of the present invention; and FIG. 2 is a cross-sectional view in a longitudinal direction thereof.

DESCRIPTION OF THE PREFERRED EMBODIMENT

Figure 1:
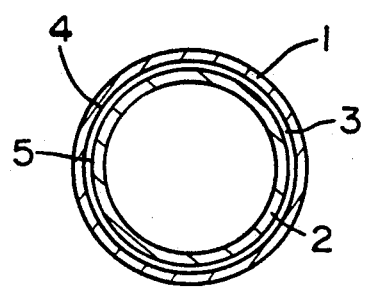
Figure 2:
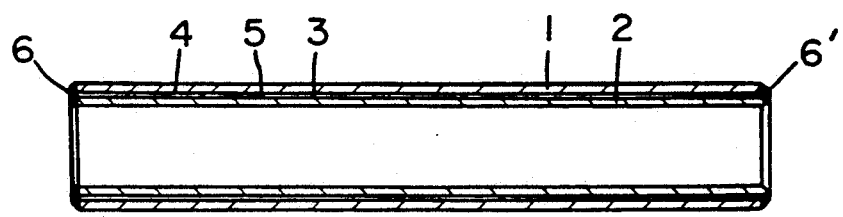

A description will now be given of an embodiment of the present invention with reference to results of a test conducted in accordance with the embodiment.

As shown in the appended drawings, a steel pipe including an outer pipe 1 with an outside diameter of 20 mm, a thickness of 1.0 mm, and a length of 300 mm and an inner pipe 2 having an outside diameter of 18 mm, a thickness of 1.0 mm, and a length of 300 mm was used. As for the inner pipe 2, various pipes having slightly varied outside diameters formed by grinding an outer surface 5 were prepared. The inner pipe 2 was inserted into the outer pipe 1 in such a manner that a very small clearance 3 is provided between an inner surface 4 of the outer pipe 1 and the outer surface 5 of the inner pipe 2, thereby forming a duplex pipe. The outer pipe 1 and the inner pipe 2 were connected to each other by welding at opposite pipe ends 6, 6' so that the inner pipe 2 will not come off. Then, the duplex pipe was suspended at the opposite ends 6, 6' by means of strings. An impact was applied to the duplex pipe from the outside by using a hammer at an identical strength, the impact noise and its subsequent change was received by a microphone at a fixed interval and was amplified by an amplifier, and the sound pressure level was measured by a recorder. The results are shown in the table below. In this table, the pipes of Nos. 1, 2, and 7 are for those of comparative examples, while those of Nos. 3 and 6 are pipes in accordance with the present invention.

| No. | Gap ($\mu$m) Between Inner Surface of Outer Pipe and Outer Surface of Inner Pipe | Sound Pressure Level (dB) | | |
|---|---|---|---|---|
| | | At the time of impact | After 10 milliseconds | After 50 milliseconds |
| 1 | 296 | 115 | 112 | 102 |
| 2 | 193 | 103 | 91 | 82 |
| 3 | 145 | 94 | 83 | 74 |
| 4 | 66 | 94 | 82 | 72 |
| 5 | 38 | 94 | 82 | 73 |
| 6 | 12 | 96 | 85 | 75 |
| 7 | 0 | 113 | 109 | 98 |

As shown in the table above, the duplex pipe of Experiment 7 in which the inner and outer pipes were brought into close contact with each other displayed characteristics equivalent to those of a single pipe having a thickness in which the thicknesses of the inner and outer pipes are combined. In the case of the duplex pipe of Experiment 2 in which the clearance between the inner and outer pipes was large, no appreciable effect was observed in terms of both the impact noise and damping performance. Moreover, the generation of a so-called chattering which occurs during a collision between the outer pipe 1 and the inner pipe 2 was detected at the time of impact. In the case of the duplex pipe of Experiment 2, a substantial effect was observed for both the impact noise and damping performance, but the chattering occurred at the time of impact, so that it was verified that this pipe is not good for practical use. In contrast, in the case of duplex pipes of Experiments 3 to 6, it was verified that the inner and outer pipes are capable of being brought into contact with each other due to the vibrational displacement of the pipes in correspondence with a relatively large sound pressure level, and that the chattering due to the contact does not occur.

Thus, it is possible to obtain a duplex pipe excelling in damping effects, and sufficient damping characteristics can be obtained even if the thicknesses of the inner and outer pipes of the duplex pipe in accordance with the present invention are made identical. This can be explained as follows: In general, the intrinsic frequency differs depending on a difference in the quality of materials used, a difference in the thickness, or other factors, and also differs depending on cross-sectional areas of constituent materials and cross-sectional secondary moment. In the case of flat plates, if two plates of the same material and the same vertical and horizontal dimensions are used, it is necessary to change the thicknesses in order to change the cross-sectional areas and the cross-sectional secondary moment. In the case of a pipe, however, even if the inner and outer pipes are formed of the same material and have the same length, thickness, etc., since the outside diameters differ, the cross-sectional areas and the cross-sectional secondary moment differ. Hence, a difference arises in the intrinsic frequencies of the inner and outer pipes, so that a sufficient effect can be displayed. It goes without saying that if the thicknesses are made different so as to make the difference in their intrinsic frequencies even greater, the effect can be enhanced even further.

Since the duplex metal pipe in accordance with the present invention has a specific clearance formed therebetween, it is possible to provide a simple arrangement without using any members other than metal pipes. The duplex metal pipe thus displays noticeable effects without undergoing variations in the performance otherwise caused by the denaturing of a filler material due to heat, and is capable of demonstrating an extremely outstanding damping effect over extended periods of time.

What is claimed is:

1. A duplex metal pipe for damping comprising an inner pipe having opposed ends and a cylindrical outer surface and an outer pipe having opposed ends and a substantially cylindrical inner surface, said inner pipe being secured concentrically within the outer pipe by connections at the respective opposed ends such that a substantially uniform annular clearance of 10 $\mu$m to 150 $\mu$m is provided between the inner surface of the outer pipe and the outer surface of said inner pipe extending between the connections of said outer pipe to said inner pipe.

2. A duplex metal pipe for damping according to claim 1, wherein said outer pipe and said inner pipe each are formed of steel pipes.

3. A duplex metal pipe for damping according to claim 1, wherein said inner and outer pipes both are substantially cylindrical and define radial thicknesses, the thickness of the inner pipe being substantially equal to the thickness of the outer pipe.

4. A duplex metal pipe for damping according to claim 1, wherein the clearance is between about 38 $\mu$m and 66 $\mu$m.

5. A duplex meal pipe for damping as in claim 1 wherein the inner and outer pipes each are substantially uniformly cylindrical along their entire respective lengths and are connected to one another at their respective opposed ends by weldments extending between the uniformly cylindrical inner and outer pipes.

6. A duplex metal pipe for damping comprising: an inner pipe having opposed ends defining a length therebetween and having substantially uniformly cylindrical inner and outer surfaces extending substantially along the entire length of the inner pipe, and an outer pipe having opposed ends defining a length therebetween substantially equal to the length of the inner pipe and having substantially uniformly cylindrical inner and outer surfaces, said inner pipe being secured concentrically within the outer pipe by weldments at the respective opposed ends of the inner and outer pipes such that a substantially uniform cylindrical clearance of between approximately 38 $\mu$m–66 $\mu$m is defined between the inner surface of the outer pipe and the outer surface of the inner pipe between the weldments of said inner pipe to said outer pipe, said inner and outer pipes being formed from metal of substantially equal radial thicknesses.

* * * * *